US012808384B2

(12) United States Patent
Heger et al.

(10) Patent No.: US 12,808,384 B2
(45) Date of Patent: Nov. 24, 2026

(54) COMPRESSOR DRIVESHAFT MAGNETIC SUPPORT

(71) Applicant: TRANE INTERNATIONAL INC., Davidson, NC (US)

(72) Inventors: Joseph M. Heger, West Salem, WI (US); Jay H. Johnson, Houston, MN (US); Daniel A. Strange, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 182 days.

(21) Appl. No.: 18/356,916

(22) Filed: Jul. 21, 2023

(65) Prior Publication Data

US 2025/0027503 A1 Jan. 23, 2025

(51) Int. Cl.
*F04D 29/058* (2006.01)
*H02K 7/09* (2006.01)

(52) U.S. Cl.
CPC ............. *F04D 29/058* (2013.01); *H02K 7/09* (2013.01)

(58) Field of Classification Search
CPC .... F04D 29/058; F04D 25/0606; F04D 17/10; H02K 7/09
See application file for complete search history.

(56) References Cited

U.S. PATENT DOCUMENTS 5,939,813 A * 8/1999 Schob ................... F04D 29/041 310/90
8,115,358 B1 2/2012 Rakov
9,863,431 B2 1/2018 Silva et al.
10,879,829 B2 12/2020 Severson
11,005,349 B2 * 5/2021 Ono ......................... H02K 7/09
11,300,131 B2 4/2022 Nakazawa et al.
2005/0257543 A1 * 11/2005 Martin .................. F25D 29/003 62/244

(Continued)

FOREIGN PATENT DOCUMENTS

CN 115603503 A * 1/2023 ............... H02K 7/09
CN 115603503 B 3/2023

(Continued)

OTHER PUBLICATIONS

English Machine Translation of CN-115603503-A (Year: 2023).*

(Continued)

*Primary Examiner* — Nathan C Zollinger
(74) *Attorney, Agent, or Firm* — HSML P.C.

(57) ABSTRACT

A compressor includes a driveshaft, a bearingless motor, one or more magnetic bearings, and a controller for the bearingless motor. The bearingless motor configured to rotate the driveshaft to compress a working fluid. The one or more magnetic bearings magnetically support the driveshaft when rotating. The controller is configured to adjust magnetic support provided by the bearingless motor to the driveshaft based on operation of the compressor. A method of operating a compressor includes rotating, with a bearingless motor, a driveshaft to compress a working fluid and magnetically supporting, with one or more magnetic bearings, the driveshaft. The method also includes magnetically supporting, with the bearingless motor, the driveshaft in which the magnetic support provided by the bearingless motor is adjusted based on operation of the compressor.

18 Claims, 3 Drawing Sheets

(56) References Cited

U.S. PATENT DOCUMENTS

| | | | |
|---|---|---|---|
| 2010/0033046 | A1 | 2/2010 | Chiba et al. |
| 2010/0109463 | A1 | 5/2010 | Jiang et al. |
| 2010/0231076 | A1 | 9/2010 | Chiba et al. |
| 2020/0096220 | A1 | 3/2020 | Nakazawa et al. |
| 2021/0115929 | A1* | 4/2021 | Nakazawa ............ F04D 29/051 |
| 2025/0377019 | A1* | 12/2025 | Sakuragi ............. F16C 32/0474 |

FOREIGN PATENT DOCUMENTS

| | | | |
|---|---|---|---|
| JP | 2020012405 | A * | 1/2020 |
| WO | 2020/108990 | A1 | 6/2020 |
| WO | 2022/196159 | A1 | 9/2022 |
| WO | 2022/202543 | A1 | 9/2022 |

OTHER PUBLICATIONS

English Machine Translation of abstract for JP-2020012405-A (Year: 2020).*
Extended European Search Report, European Patent Application No. 24187795.0, Nov. 20, 2024 (9 pages).

* cited by examiner

COMPRESSOR DRIVESHAFT MAGNETIC SUPPORT

FIELD

This disclosure relates to magnetically supporting a driveshaft in a compressor in an HVACR system. More specifically, this disclosure relates to magnetically supporting a driveshaft in compressors used in heating, ventilation, air conditioning, and refrigeration ("HVACR") systems.

BACKGROUND

HVACR systems are generally used to heat, cool, and/or ventilate an enclosed space (e.g., an interior space of a commercial building or a residential building, an interior space of a refrigerated transport unit, or the like). A HVACR system may include a refrigerant circuit that utilizes a working fluid for providing cooled or heated air to an area. The refrigerant circuit includes a compressor. The compressor includes a driveshaft that is rotated to compress the working fluid, and one or more bearings for supporting the rotating driveshaft within the compressor. The one or more bearings may include magnetic bearings for providing magnetic support to the rotating driveshaft.

SUMMARY

A HVACR system can include a refrigerant circuit configured to heat or cool a process fluid (e.g., air, water and/or glycol, or the like). The refrigerant includes a compressor that compresses a working fluid circulated through the refrigerant circuit.

In an embodiment, a compressor includes a driveshaft, a bearingless motor, one or more magnetic bearings, and a controller. The bearingless motor is configured to rotate the driveshaft to compress a working fluid and the one or more magnetic bearings are configured to magnetically supporting the driveshaft while rotating. The controller is configured to adjust magnetic support provided by the bearingless motor to the driveshaft when rotating based on operation of the compressor.

In an embodiment, a method is directed to operating a compressor that includes the driveshaft, one or more magnetic bearings, and a bearingless motor. The method includes rotating, with the bearingless motor, the driveshaft to compress a working fluid, and magnetically supporting, with the one or more magnetic bearings, the driveshaft being rotated. The method also includes magnetically supporting, with the bearingless motor, the driveshaft. The magnetic supporting of the driveshaft with the bearingless motor includes adjusting a magnetic support provided by the bearingless motor to the driveshaft based on operation of the compressor.

BRIEF DESCRIPTION OF DRAWINGS

Like numbers represent like features.

DETAILED DESCRIPTION

Figure 1:
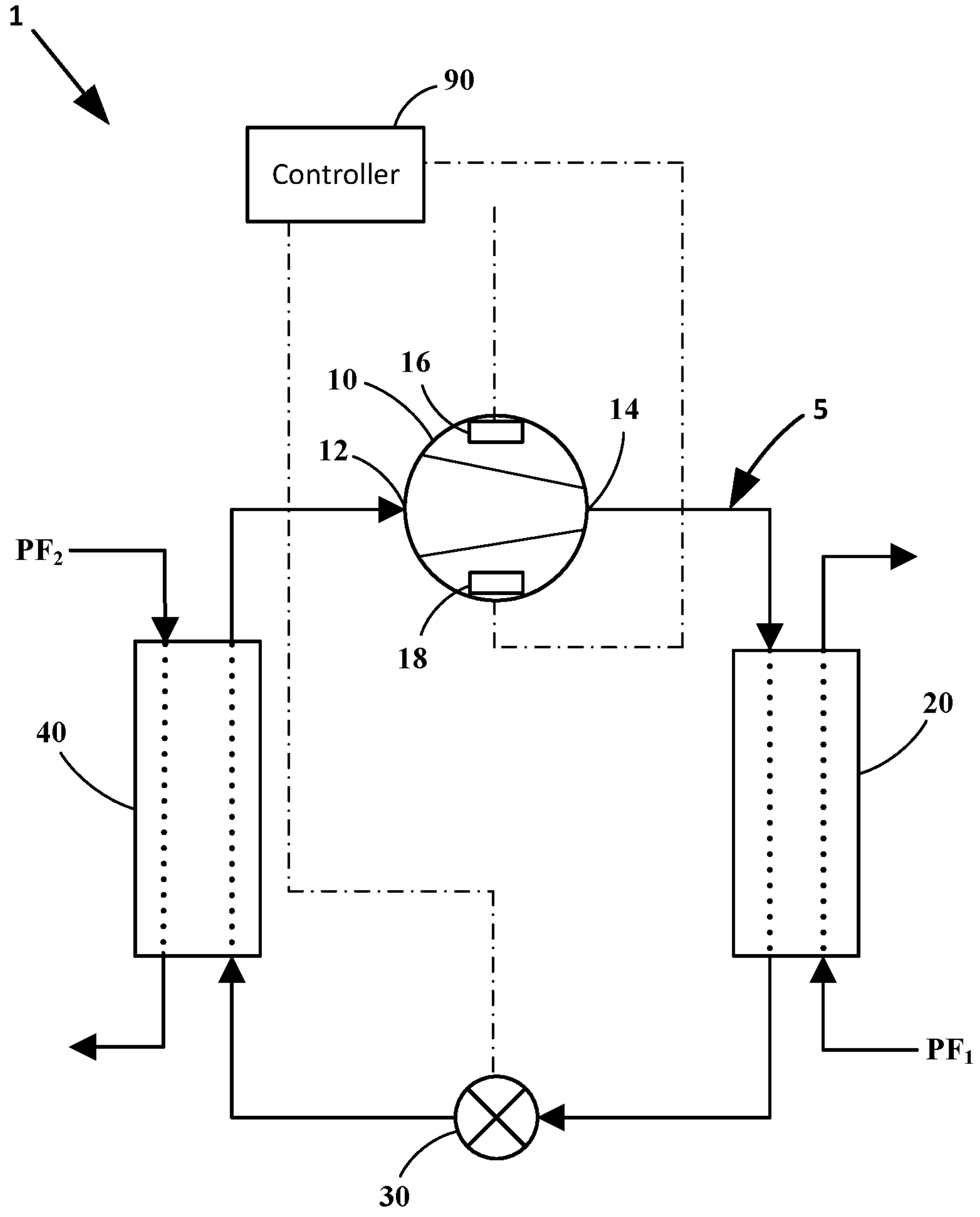
FIG. 1 is a schematic diagram of an embodiment of a refrigerant circuit in an HVACR system.

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like) that circulates through the heat transfer circuit. The working fluid is utilized to heat or cool a process fluid (e.g., air, water and/or glycol, or the like).

The compressor includes a driveshaft, an electric motor that rotates the driveshaft (e.g., relative to a housing of the compressor) to compress the working fluid, and one or more magnetic bearings to support the rotating driveshaft. The load applied to the driveshaft can vary during operation of the compressor. For example, operating the compressor at some conditions can cause a substantially increased load on the driveshaft.

Abnormal flow through the compressor may cause a substantially increased load on the driveshaft. Abnormal flow may occur when a compressor undergoes, a stall, a surge, a shock load, asymptomatic pressure, or the like. Stall occurs, for example, when the flow through the compressor has a localized region with a reduced velocity and adverse pressure gradient(s). This localized region can result in flow separation and/or flow misalignment when encountering a compressing component of a compressor (e.g., an impeller, screw, and the like). Surge occurs, for example, when the flow through the compressor at least temporarily stops and/or reverses. Asymptomatic pressure occurs when the circumferential pressure distribution become asymmetric, which results in an additional radial load on the driveshaft. Surge, stall, and asymptomatic pressure can occur at various operating conditions of the compressor, but are more likely to occur when operating the compressor closer to upper and lower boundaries for its volumetric flow rate in its operating map. Surge and stall can occur due to, for example, operating the compressor at high pressure ratio, unloading the capacity of the compressor at high pressure ratio, unstable chiller water temperature control, frequent compressor/refrigerant circuit staging on/off, or the like. A shock load occurs, for example, when the flow entering the compressor contains an excessive amount of liquid. For example, the occurrence of liquid suction carryover in the refrigerant circuit can cause a shock load. The higher-density fluid impacts the compression component (e.g., the impeller, screw, and the like) of the compressor and can radially and/or axially push the compression component. Stall, surge, asymptomatic pressure, and/or a shock load can cause an increase in the axial load and/or radial load on the rotating shaft. Imbalances in the driveshaft assembly can also cause the driveshaft to have an increased load on the bearings. Misalignment, due to assembly tolerances, manufacturing tolerances, or the like, between the stator axis and the rotor axis of the electric motor can also cause an increase in a load of the driveshaft on the bearings. The increased load of the driveshaft is applied to the bearing(s) (e.g., increased load of the driveshaft on the bearing(s) that are supporting the driveshaft while it rotates). Such increased loads may cause issues for the magnetic bearing(s) without increasing a size of the magnetic bearing(s).

Embodiments disclosed herein are directed to compressors, the HVACR systems that include compressors, and refrigerant circuits that include compressors, that utilize a bearingless motor in combination with magnetic bearing(s) configured to provide magnetic support of the driveshaft. The bearingless motor is configured to have a magnetic support that is adjusted based on the operation of the compressor such that adequate support for an increased load on the driveshaft is efficiently provided to the driveshaft. For example, the bearingless motor in combination with magnetic bearing(s) may advantageously allow for operation of the compressor at conditions at/near stall and/or surge without utilizing larger magnetic bearings (e.g., to compensate for the increased load caused by stall and surge).

FIG. 1 is a schematic diagram of an embodiment of a refrigerant circuit 5 in an HVACR system 1. In an embodiment, the heat transfer circuit 5 is utilized in a HVACR system. The refrigerant circuit 5 includes a compressor 10, a condenser 20, an expansion device 30, and an evaporator 40. In an embodiment, the refrigerant circuit 5 can be modified to include additional components, such as, for example, an economizer heat exchanger, one or more valve(s), sensor(s) (e.g., a flow sensor, a temperature sensor, and the like), a receiver tank, and the like.

The components of the refrigerant circuit 5 are fluidly connected. The refrigerant circuit 5 can be configured as a cooling system that can be operated in a cooling mode (e.g., a fluid chiller of an HVACR system, an air conditioning system, or the like), or the refrigerant circuit 5 may be configured as a heat pump system that can be run in a cooling mode or a heating mode.

A working fluid flows through the refrigerant circuit 5. The working fluid in the refrigerant circuit 5 flows through the compressor 10, the condenser 20, the expansion device 30, the evaporator 40, and back to the compressor 10. The working fluid can include one or more refrigerant(s).

Working fluid in a lower pressure gaseous state or mostly gaseous state is drawn into the suction inlet 12 of the compressor 10. The working fluid is compressed as it flows through the compressor 10 from the suction inlet 12 to the discharge outlet 14 of the compressor 10. The working fluid flows from the discharge outlet 14 of the compressor 10 through the main flow path 5 to the condenser 20.

A first process fluid $PF_1$ flows through the condenser 20 separate from the working fluid. The condenser 20 is a heat exchanger that allows the working fluid and the first process fluid $PF_1$ to be in a heat transfer relationship without physically mixing as they each flow through the condenser 20. As the working fluid flows through the condenser 20, the working fluid is cooled by the first process fluid $PF_1$. Accordingly, the first process fluid $PF_1$ is heated by the working fluid and exits the condenser 20 at a higher temperature relative to temperature at which it entered the condenser 20. In an embodiment, the first process fluid $PF_1$ may be air, water and/or glycol, or the like that is suitable for absorbing and transferring heat from the working fluid and the refrigerant circuit 5. For example, the first process fluid $PF_1$ may be ambient air circulated from an outside atmosphere, water to be heated as hot water, or any suitable fluid for transferring heat from the refrigerant circuit 5. The working fluid is cooled by the condenser 20 and becomes liquid or mostly liquid as it is cooled in the condenser 20.

The liquid/gaseous working fluid flows from the condenser 20 to the expansion device 30. The expansion device 30 allows the working fluid to expand. The expansion causes the working fluid to significantly decrease in temperature. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in temperature. The gaseous/liquid working fluid has a lower temperature after being expanded by the expansion device 30.

The lower temperature gaseous/liquid working fluid then flows from the expansion device 30 to and through the evaporator 40. A second process fluid $PF_2$ also flows through the evaporator 40 separately from the working fluid. The evaporator 40 is a heat exchanger that allows the working fluid and the second process fluid $PF_2$ to be in a heat transfer relationship within the evaporator 40 without physically mixing. As the working fluid and the second process fluid $PF_2$ flow through the evaporator 40, the working fluid absorbs heat from the second process fluid $PF_2$ which cools the second process fluid $PF_2$. Accordingly, the second process fluid $PF_2$ exits the evaporator 40 at a lower temperature than the temperature at which it entered the evaporator 40. The working fluid is gaseous or mostly gaseous as it exits the evaporator 40. The working fluid flows from the evaporator 40 to the suction inlet 12 of the compressor 10.

In an embodiment, the second process fluid $PF_2$ is air cooled by the HVACR system and ventilated to the enclosed space to be conditioned. In an embodiment, the second process fluid $PF_2$ is an intermediate fluid (e.g., water, heat transfer fluid, or the like), and the cooled second process fluid $PF_2$ may be utilized by the HVACR system to cool air in or ventilated to the enclosed space to be conditioned.

Dotted lines are provided in FIG. 1 to indicate fluid flows through some components (e.g., condenser 20, evaporator 40) for clarity, and should be understood as not specifying a specific route in each component. Dashed lines are provided in the Figures to indicate some features that may be different in other embodiment. Dashed dotted lines are provided in FIGS. 1 to illustrate electronic communications between different features. For example, a dashed-dotted line extends from the controller 90 to a motor 16 of the compressor 10. For example, a dashed-dotted line extends from the controller 90 to a magnetic bearing 18 of the compressor 10 as the controller 90 controls operation of the magnetic bearing(s) 18 of the compressor 10. For example, a dashed-dotted line extends from the controller 90 to the expander 30 as the controller 90 controls the compressor 10. In an embodiment, the controller 90 includes memory (not shown) for storing information and a processor (not shown). The controller 90 in FIG. 1 and described below is described/shown as a single component. However, it should be appreciated that a "controller" as shown in FIG. 1 and described herein may include multiple discrete or interconnected components that include a memory (not shown) and a processor (not shown) in an embodiment. For example, the controller 90 may include a HVACR controller component configured to control overall operation of the HVACR system 1 and a compressor controller component configured to control operation of the compressor. For example, the HVACR controller component may be configured to determine a cooling requirement for the refrigerant circuit 5 (e.g., based on a desired temperature and actual temperature of the enclosed space being conditioned by the HVACR system 1), and the compressor controller may be configured to select a speed and a discharge pressure for the compressor 10 corresponding to the cooling requirement.

Figure 2:
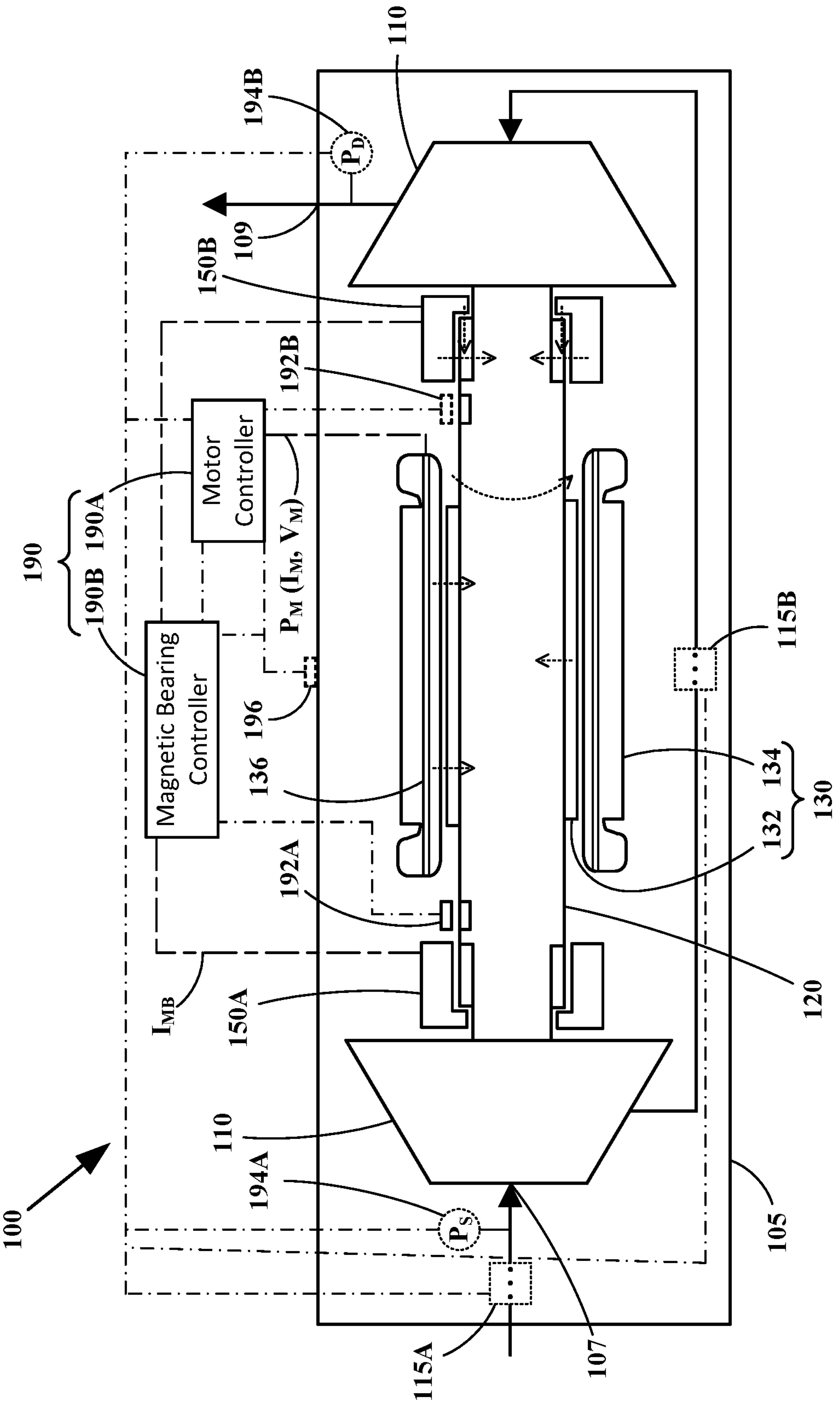
FIG. 2 is a schematic diagram of an embodiment of a compressor.

FIG. 2 is a schematic diagram of a compressor 100. In an embodiment, the compressor 100 may be the compressor 10 in FIG. 1. The compressor 100 includes a compressor housing 105, a driveshaft 120, an bearingless motor 130, and one or more magnetic bearings 150A, 150B. The compressor 100 includes an inlet 107 and an outlet 109. For example, the inlet 107 and outlet 109 are formed in the compressor housing 105. Working fluid to be compressed flows into the compressor 100 through the inlet 107 and the compressed working fluid is discharged from the compressor through the outlet 109.

The bearingless motor 130 is configured to rotate the driveshaft 120. For example, the driveshaft 120 is rotated relative to the compressor housing 105. The compressor 100 includes impellers 110 affixed onto the driveshaft 120, such that rotation of the driveshaft 120 also rotates the impellers 110. For example, the driveshaft 120 and impellers 110 are rotated relative to the compressor housing 105. When the driveshaft 120 is rotated, the rotating impellers 110 suctions a flow of gaseous working fluid f into the compressor 100 at a relatively lower pressure (e.g., at a suction pressure $P_S$, as uncompressed gas, through the inlet 107) and compresses the gaseous working fluid within the compressor 100. The compressed gaseous working fluid is then discharged from the compressor 100 at a relatively higher pressure (e.g., at a discharge pressure $P_D$, as compressed gas, discharged from the outlet 109). The driveshaft 120 is rotated to compress (gaseous) working fluid within the compressor 100.

The compressor 100 in FIG. 2 is a centrifugal compressor with two impellers 110. The impellers 110 are the compression mechanisms of the compressor 100 in FIG. 2. However, it should be appreciated that the compressor 100 in an embodiment may be a different type of compressor with a different type and/or a different number of compression mechanisms. In an embodiment, the compressor 100 may be a scroll compressor that includes one or more scroll(s) (not shown) affixed to the driveshaft 120 instead of the impellers 110. In an embodiment, the compressor 100 may be a screw compressor that includes a screw (not shown) affixed to the driveshaft 120 instead of the impellers 110. In an embodiment, the compressor 100 may include one or more compression mechanisms affixed to the driveshaft 120 (e.g., a single impeller 110, more than two impellers 110, a single scroll, two scrolls, or the like).

The compressor 100 includes a controller 190. The controller 190 can include a magnetic bearing controller 190B for controlling operation of the magnetic bearing(s) 150A and a motor controller 190B for controlling operation of the bearingless motor 130. The magnetic bearing controller 190B and the motor controller 190A may be discreet modules as shown in FIG. 2. It should be appreciated that the controllers 190A, 190B in another embodiment may be incorporated into a single module. A controller (e.g., controller 190, motor controller 190A, magnetic bearing controller 190B) can include a memory (not shown) and a processor (not shown) that operates according to instructions stored in the memory.

As shown in FIG. 2, the compressor 100 may include one or more suction throttles 115A, 115B. In the illustrated embodiment, a first suction throttle 115A is disposed to control a flowrate of the working fluid into a first impeller 110, and second suction throttle 115B disposed to control the flowrate of the working fluid into a second impeller 110 (e.g., disposed in the flowpath between the first impeller 110 and the second impeller 110, controlling the working fluid flowing from the first impeller 110 to the second impeller 110). For example, the first suction throttle 115A may be inlet guide vanes. For example, the second suction throttle 115B may be an interstage throttle (e.g., interstage throttle ring, or the like). The suction throttles 115A, 115B may be controlled by the controller 190 of the compressor 100 (e.g., by the motor controller 190A).

The bearingless motor 130 includes a rotor 132 and a stator 134. The rotor 132 and the driveshaft 120 are affixed together such that they rotate together. For example, the rotor 132 and the driveshaft 120 can be affixed together using an interference fit or other type of fit. A bearingless motor is a type of electric motor capable of operating to apply both a rotational force (e.g., torque) and a suspension force to a driveshaft. The stator 134 generates an adjustable magnetic field to apply a rotational magnetic force and suspension magnetic force to the rotor 132. As the rotor 132 is affixed to the driveshaft 120, the rotational (magnetic) force and the suspension (magnetic) force is then applied to the driveshaft 120. The suspension (magnetic) force provides magnetic support of driveshaft 120. A suspension force and suspension magnetic force may alternatively be referred to as a levitating force (or levitation magnetic force) for the driveshaft 120.

The stator 134 can include windings 136. For example, following the principles of bearingless electrical motors, the electrical current through the windings 136 is adjusted to adjust the magnetic force applied to the driveshaft 120. The compressor includes a motor controller 190A for controlling operation of the bearingless motor 130. The motor controller 190A can adjust the electrical current (e.g., increase an amount of electrical current, decrease an amount of electrical current) through flowing through one or more of the windings 136 to adjust the rotational magnetic force and the suspension magnetic force applied to the driveshaft 120. The suspension magnetic force may be adjusted separately from the rotational magnetic force (e.g., adjust the suspension magnetic force applied to the driveshaft 120 while having at or about constant rotational magnetic force). The control of the bearingless motor 130 is discussed in more detail below.

The magnetic bearings 150A, 150B are configured to magnetically support the rotating driveshaft 120. The magnetic bearings 150A, 150B operate according to known principles for magnetic bearings. For example, the magnetic bearing(s) 150A, 150B apply a magnetic force to the driveshaft 120 that supports/levitates the driveshaft 120 while it rotates. As shown in FIG. 2, the magnetic bearing(s) 150A, 150B are each spaced apart from the bearingless motor 130 (e.g., spaced apart along the length of the driveshaft 120). The compressor 100 can include a magnetic bearing controller 190B configured to operate the magnetic bearing(s) 150A, 150B. For example, the controller 190B can be configured to adjust the magnetic forced applied by the magnetic bearing(s) 150A, 150B to the driveshaft 120 to keep the driveshaft 120 in a relatively constant position (e.g., relative to the compressor housing 105). In an embodiment, the motor controller can be configured to communicate with the magnetic bearing controller for operating the magnetic support of the bearingless motor 130 (e.g., to have the magnetic bearings and the bearingless motor magnetic support the driveshaft in a synergistic manner).

The magnetic bearing(s) 150A, 150B include at least one radial magnetic bearing. The radial magnetic bearing may be as part of combined radial and thrust magnetic bearing. In the illustrated embodiment, the compressor 100 includes two magnetic bearings 150A, 150B that are each a combined radial and thrust magnetic bearing. The magnetic bearing(s) 150A, 150B provide radial support of the driveshaft 120 (e.g., shown by dashed arrows in FIG. 2 for magnetic bearing 150B) to levitate the driveshaft 120. The magnetic bearing(s) 150A, 150B may also provide axial support of the driveshaft 120 (e.g., shown by dashed arrows in FIG. 2 for magnetic bearing 150B).

The controller 190 (e.g., motor controller 190A) is configured to adjust the magnetic support provided by the bearingless motor 130 based on operation of the compressor 100. Dashed dotted lines are provided in FIG. 2 to illustrate electronic communications between different features. For example, a dashed-dotted line extends from the controller 190 (e.g., magnetic bearing controller 190B) from sensor 192A as the controller 190 receives measurements from the sensor 192A. Long-short dash lines are provided in FIG. 2 to illustrate electrical power. For example, a long-short dash line extends from the controller 190 (e.g., magnetic bearing controller 190B) to the magnetic bearing 150A as the controller 190 provides electrical power to the magnetic bearing 150A to control operation of the magnetic bearing 150A (e.g., direction of magnetic force(s) applied by the magnetic bearing 150A to the driveshaft 120). The adjusting of the magnetic support provided by the bearingless motor 130 may refer to adjusting of degree of magnetic support (e.g., maximum amount of magnetic support, maximum amount of magnetic suspension force) provided to the driveshaft 120.

In an embodiment, the bearingless motor 130 may be configured to selectively provide magnetic support to the rotating driveshaft 120. For example, the magnetic support of the bearingless motor 130 is only activate when the driveshaft has an increased load (e.g., an increased load for the magnetic bearing(s) 150A, 150B to support). This can advantageously allow the compressor 100 to efficiently provide increased support to the driveshaft 120 (e.g., the magnetic support of the bearingless motor 130 only active for a portion of the normal operation of the compressor 100). For example, the bearingless motor 130 may be used instead of utilizing increased magnetic bearing size to address increased loads caused by abnormal flow through the compressor, such that the compressor 100 has a reduced electrical power consumption (e.g., relative to a compressor with the larger sized magnetic bearing). In an embodiment, the magnetic bearings 150A, 150B may be sized for providing adequate support during the steady state operation of the compressor 100 and to utilize the magnetic support of the bearingless motor 130 for providing the increased support for adequately supporting the driveshaft 120 when compressor operation causes the driveshaft 120 to have a significantly increased load.

In an embodiment, the magnetic support provided by the bearingless motor 130 is adjusted based on one or more operational condition(s) of the compressor. The compressor 100 may include one or more sensors 192A, 192B, 194A, 194B, 196 for detecting the operating condition(s) of the compressor 100. For example, the magnetic support provided by the bearingless motor 130 is adjusted by the operating condition(s) detected by one or more of the sensor(s) 192A, 192B, 194A, 194B. The operating condition(s) can include, but are not limited to, the position of the driveshaft 120, a suction pressure $P_S$ of the compressor 100, a discharge pressure $P_D$ of the compressor, a speed of the compressor 100 (e.g., speed of the motor 130), or the like.

The compressor 100 can include one or more driveshaft position sensors 192A, 192B for detecting a position of the driveshaft 120 (e.g., a relative position of the driveshaft 120). For example, a driveshaft position sensor 192A, 192B is configured to detect a relative axial position and/or a relative radial position of the driveshaft 120 (e.g., relative to the driveshaft position sensor, relative to a desired operating position of the driveshaft 120, or the like). A driveshaft position sensor 192A can be used by the magnetic bearing(s) 150A, 150B to adjust the magnetic force applied to the driveshaft 120 by the magnetic bearing(s) 150A, 150B. For example, when the driveshaft 120 moves in first radial direction (e.g., in radial direction D1), the magnetic bearing(s) 150A, 150B increase the magnetic force applied to the driveshaft 120 in the opposite direction to push/move the driveshaft 120 back towards/into the desired operating position.

A driveshaft position sensor 192B can be used for controlling the magnetic support of the bearingless motor 130. For example, the motor controller 190A can be configured to detect a (current) position of the driveshaft 120 using the driveshaft position sensor 192B, to adjust the magnetic support of the bearingless motor 130 (e.g., the suspension magnetic force) based on the detected position of the driveshaft 120. In another embodiment, the motor controller 190A may be configured to use the same driveshaft position sensor 192A as the magnetic bearing(s) 150A, 150B.

The driveshaft position sensors 192A, 192B are shown in a single element in FIG. 2. However, it should be appreciated that each driveshaft sensor 192A, 192B in an embodiment may include a plurality of sensing elements (e.g., gap sensor elements). For example, sensing elements may be spaced apart along the circumference of the driveshaft 120 at 90° increments, 60° increments, 30° increments, or the like. In an embodiment, each sensing element may be configured to sense a current distance (e.g., radial gap) between the driveshaft 120 and each sensing element, and a position of the driveshaft 120 is determined from the distances sensed by the sensing elements.

The compressor 100 can include one or more pressure sensors 194A, 194B. As shown in FIG. 2, the compressor 100 may include an inlet pressure sensor 194A and an outlet pressure sensor 194B. The inlet pressure sensor 194A is configured to detect a suction pressure $P_S$ of the working fluid entering the compressor 100 (e.g., suctioned from the evaporator 40 into the compressor 10 in FIG. 1). The outlet pressure sensor 194B is configured to detect a discharge pressure $P_D$ of the (compressed) working fluid discharged from the compressor 100 (e.g., discharged from the compressor 10 to the condenser 20 in FIG. 1). The pressure sensors 194A, 194B are shown as internal sensors in FIG. 2. It should be appreciated that one or more of the pressure sensors 194A, 194B in other embodiments may be disposed external to the compressor 100 (e.g., in the refrigerant circuit downstream of the evaporator and upstream of the compressor, in the refrigerant circuit between downstream of the compressor and upstream of the evaporator, or the like).

The magnetic support provided by the bearingless motor 130 to the driveshaft 120 can be adjusted based on an operating map for the compressor 100. For example, the bearingless motor 130 is configured to provided increased suspension magnetic force (e.g., activated and/or increased from a lower amount) to the driveshaft 120 when the compressor 100 is operating in specific region(s) of the operating map (e.g., region(s) that cause an increased radial load on the driveshaft 120, region(s) that cause an increased axial load on the driveshaft 120). In such an embodiment, the suspension magnetic force provided by the bearingless motor 130 can be adjusted based on the suction pressure $P_S$, the discharge pressure $P_D$, and the speed of the compressor 100. For example, the suction pressure $P_S$, the discharge pressure, and the speed of the compressor 100 can be used to determine the compression ratio of the compressor 100 and the mass flowrate of the working fluid through the compressor 100 to indicate a current operating point on the operating map of the compressor. For example, an operating map for the compressor 100 may be stored in the controller 190 (e.g., in the memory of the controller 190, in the memory of the motor controller 190A) in the form of a lookup table or a formula.

In an embodiment, the magnetic support provided by the bearingless motor 130 to the driveshaft 120 can be adjusted based on a (detected) position of the driveshaft 120. The position of the driveshaft can be detected using the driveshaft position sensor 192A and/or the driveshaft position sensor 192B. For example, the bearingless motor 130 can be configured to provided increased suspension magnetic force when the detected position of the driveshaft 120 varies from its desired position by more than a predetermined amount (e.g., detected position 120 is different from the desired position by a predetermined amount, the variation in the position of the driveshaft 120 from the desired position is varying by more than a predetermined amount, or the like). The increased variation in the position of the driveshaft 120 can indicate that an increased load on the driveshaft 120 (e.g., instability in the driveshaft 120).

In an embodiment, the magnetic support provided by the bearingless motor 130 to the driveshaft 120 can be adjusted based on vibration of the compressor. Vibration can indicate the occurrence of abnormal flow through the compressor 100. The magnetic support provided by the bearingless motor 130 may be adjusted based on detected vibration of the driveshaft 130. For example, the vibration of the driveshaft may be detected using the driveshaft position sensor 192A and/or the driveshaft position sensor 192B (e.g., vibration determined from change in the detected position of the driveshaft 130 over time). The compressor may include a vibration sensor 196 (e.g., an accelerometer or the like) for detecting vibration of the compressor 100 (e.g., vibration of the compressor housing 105 or the like). For example, the bearingless motor 130 can be configured to provided increased suspension magnetic force when the vibration of the compressor 100 is greater than a predetermined amount.

In an embodiment, the magnetic support provided by the bearingless motor 130 to the driveshaft 120 can be adjusted based a pressure of the working fluid within the compressor 100. Changes in the pressure of the working fluid can indicate the occurrence of abnormal flow through the compressor 100. For example, frequency changes in the pressure of the working fluid within the compressor 100 can indicate the occurrence of stall and/or surge. For example, the compressor 100 can include a pressure sensor (e.g., pressure sensor 194A, pressure sensor 194B, a pressure sensor (not shown) disposed in the flow path between stages, or the like) to detect the pressure of the working fluid within the compressor (e.g., dynamic pressure of the working fluid). For example, the bearingless motor 130 can be configured to provided increased suspension magnetic force when the frequency changes in the detected pressure of the compressor 100 is greater than a predetermined amount and/or outside of a predetermined range.

In an embodiment, the magnetic support provided by the bearingless motor 130 to the driveshaft 120 can be adjusted based operation of a suction throttle 115A, 115B of the compressor 100. The impact of a suction throttle on the flow of working fluid can indicate whether flow through the compressor is abnormal (e.g., actuation of the suction throttle having a reduced/different impact on operation of the compressor 100 indicates abnormal flow through the compressor 100, the suction throttle's position not resulting in the expected flowrate and/or operation of the compressor). For example, the bearingless motor 130 can be configured to provided increased suspension magnetic force when a position of a suction throttle 115A, 115B impacts operation of the compressor 100 differently than expected (e.g., by more than a predetermined amount).

In an embodiment, the magnetic support provided by the bearingless motor 130 to the driveshaft 120 can be adjusted based the electrical power to the magnetic bearing(s) 150A, 150B and/or the electrical power to the bearingless motor 130. For example, increased electrical power to the magnetic bearing(s) 150A, 150B and/or to the bearingless motor 130 can indicate instability in the driveshaft 120 and/or abnormal flow through the compressor (e.g., the driveshaft 130 can rotate easier during surge). The controller 190 (e.g., magnetic bearing controller 190B) can detect the amount of electrical power (e.g., current $I_{MB}$) currently being supplied to the magnetic bearing 150A, 150B. The controller 190 (e.g., motor controller 190A) can detect the amount of electrical power $P_M$ (e.g., current $I_M$, voltage $V_M$) currently being supplied to the bearingless motor 130. For example, the bearingless motor 130 can be configured to provided increased suspension magnetic force when the supplied electrical power is exceeds a predetermined maximum power limit or is less than a predetermined minimum power limit (e.g., supplied current $I_{MB}$ exceeds a predetermined current maximum, supplied current $I_M$ exceeds a predetermined voltage limit or is less than a predetermined voltage minimum, voltage $V_M$ exceeds a predetermined voltage maximum or is less than a predetermined voltage minimum).

The suspension magnetic force (e.g., magnetic support) provided by the bearingless motor 130 can be configured to supplement the magnetic support provided by the magnetic bearing(s) 150A, 150B. The suspension magnetic force provided by the bearingless motor 130 is adjusted during normal operation of the compressor 100. Normal operation refers to operation that is not during the start-up and is not during shut-down of the compressor 100. The compressor 100 is configured to utilize the magnetic support of the bearingless motor 130 to continue operating during one or more of surge and stall of the compressor 100 (e.g., to not start a shut-down, to maintain its compressing/current operation until the surge and/or the stall ends, or the like).

Figure 3:
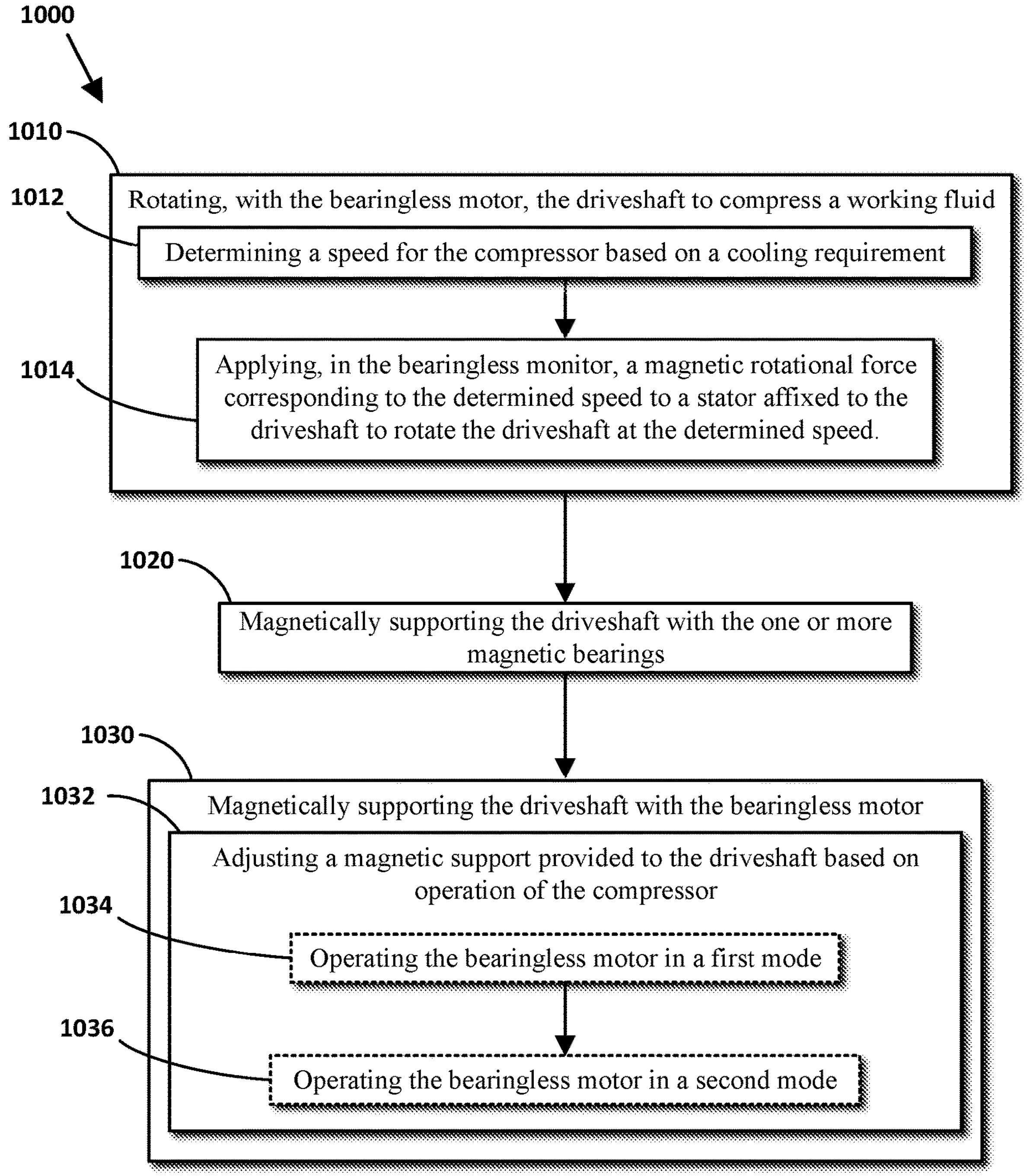
FIG. 3 is a block flow diagram of an embodiment of a method of operating a compressor.

FIG. 3 shows a block flow diagram of a method 1000 of operating a compressor, according to an embodiment. For example, the method 1000 may be employed for the compressor 1 in FIG. 1 or for operating the compressor 100 in FIG. 2. The compressor includes a driveshaft (e.g., driveshaft 120), one or more magnetic bearings (e.g., magnetic bearing 150A, magnetic bearing 150B) and a bearingless motor (e.g., bearingless motor 130). The method 1000 starts at 1010.

At 1010, the driveshaft is rotated by the bearingless motor to compress a working fluid. At 1010, the bearingless motor generates a rotational magnetic force that causes rotation of the driveshaft. For example, the bearingless motor includes a rotor (e.g., rotor 132) affixed to the driveshaft and a stator (e.g., stator 134). The stator generates a magnetic field that applies a rotational (magnetic) force to the stator, which causes rotation of the stator and the driveshaft to which the stator is affixed. The rotation of the driveshaft compresses the working fluid within the compressor.

In an embodiment, the rotating of the driveshaft at 1010 can include determining a speed for the compressor based on a cooling requirement of a refrigerant circuit of the compressor 1012 (e.g., refrigerant circuit 5). For example, a speed for the compressor can be selected based on the cooling requirement. Then, the bearingless motor applies a magnetic rotational force that corresponds to the determined speed to the stator to rotate the driveshaft at the determined speed at 1014. The method 1000 then proceeds to 1020.

At 1020, the one or more magnetic bearings provide magnetic support to the driveshaft. The magnetic support can be configured to levitate the driveshaft. For example, the magnetic bearing(s) providing magnetic support to the driveshaft at 1020 can include sensing a position of the driveshaft, via a position sensor for the driveshaft (e.g., driveshaft position sensor 192A, driveshaft position sensor 192B). The magnetic bearing(s) applying magnetic force(s) to the driveshaft to keep the driveshaft at its desired position. The method 1000 then proceeds to 1030.

At 1030, the bearingless motor provides magnetic support to the driveshaft. The bearingless motor providing magnetic support to the driveshaft at 1030 includes adjusting the magnetic support provided by the bearingless motor to the driveshaft based on operation of the compressor 1032. For example, the amount of magnetic support provided by the bearingless motor is adjusted based on the operation of the compressor at 1032. In an embodiment, the adjusting at 1030 is not adjusting of specific directional magnetic force (s) applied to the driveshaft to provide the magnetic support.

The adjusting of the magnetic support provided by the bearingless motor based on operation of the compressor at 1032 can include adjusting the magnetic support based on one or more operational conditions of the compressor 100. For example, such operational condition(s) may include, but are not limited to, a position of the driveshaft, a working fluid pressure within the compressor (e.g., a suction pressure of the compressor, a discharge pressure of the compressor, dynamic pressure of the working fluid within the compressor), a speed of the compressor (e.g., speed of the bearingless motor), vibration of the compressor (e.g., vibration of the driveshaft, vibration of the compressor housing, or the like), electrical power to one or more of the magnetic bearing(s) and the bearingless motor, a position of a suction throttle device (e.g., first suction throttle device 150A, second suction throttle device 150B), or the like.

In an embodiment, the adjusting of the magnetic support of the bearingless motor at 1032 may include operating the bearingless motor in first mode 1034 and operating the bearingless motor in the second mode 1036. For example, the bearingless motor is changed between operating in the first mode 1034 and operating in the second mode 1036 based on operation of the compressor. In the first mode 1034, the bearingless motor can provide a first amount of magnetic support to the driveshaft. In the second mode 1036, the bearingless motor can provide a second amount of magnetic support to the driveshaft that is greater than the first amount of magnetic support. For example, the bearingless motor operates in the second mode to provide greater magnetic support to the driveshaft during less stable operation of the driveshaft. In one example, the bearingless motor can provide no substantial magnetic support to the driveshaft in the first mode 1034. No "substantial" magnetic support may include any incidental support provided when applying the rotation force to rotate the driveshaft. In another example, the bearingless motor the bearingless motor can provide magnetic support to the driveshaft in the first mode 1034 (e.g., a lessor amount of magnetic support that is greater than substantially zero). In an embodiment, the first mode and the second mode may be different portions of a same variable adjustment of the magnetic support provided by the bearingless motor. The normal operation of the compressor (i.e., not during start-up and not during a shut-down) can include operation of the compressor in the first mode 1034 and operation of the compressor in the second mode 1036.

In an embodiment, the adjusting of the magnetic support by the bearingless motor at 1032 can include adjusting the suspension support based on an operating map for the compressor. For example, the magnetic support provide by the bearingless motor is adjusted based on the suction pressure of the compressor (e.g., pressure of the working fluid flowing into the compressor), the discharge pressure of the working fluid, and the speed of the compressor. For example, the bearingless motor provides an increased magnetic support (e.g., operates in the second mode 1036) when the compressor 100 is operating in one or more predetermined regions of the operating map (e.g., region(s) that cause an increased radial load on the driveshaft 120, region(s) that cause an increased axial load on the driveshaft 120). For example, the bearingless motor 130 is configured to provide a lesser magnetic support (e.g., operates in the first operating mode 1034) when the compressor is not operating in the one or more predetermined regions of the operating map.

The adjusting of the magnetic force of the bearingless motor at 1032 can include adjusting the magnetic support based on a position of the driveshaft. In an embodiment, the adjusting at 1032 includes detecting, with a driveshaft position sensor (e.g., driveshaft position sensor 192A, driveshaft position sensor 192B), a position of the driveshaft, and adjusting the suspension magnetic force is adjusted based on the detected position of the driveshaft. For example, the bearingless motor provides an increased magnetic support when a detected position of the driveshaft varies from its desired position by more than a predetermined amount (e.g., detected driveshaft position is different from the desired position by a predetermined amount, the variation in the position of the driveshaft from the desired position is varying by more than a predetermined amount, or the like). An increased variation in the position of the driveshaft can indicate that the load on the driveshaft is exceeding the magnetic support provided by the magnetic bearing(s) at 1020. In an embodiment, the adjusting at 1032 may be based on both the operating map and the detected position of the driveshaft as discussed above.

It should be appreciated that the method 1000 in other embodiments may be modified based on the HVACR system 1 as shown in FIG. 1 and as discussed above and/or based on the compressor 100 as shown in FIG. 2 and as discussed above. For example, the method 1000 in an embodiment may be configured have the same driveshaft position sensor(s) used for operating the magnetic bearings and the bearingless motor.

Aspects: Any one of Aspects 1-9 may be combined with any of Aspects 10-20.

Aspect 1. A compressor, comprising: a driveshaft; a bearingless motor configured to rotate the driveshaft to compress a working fluid; one or more magnetic bearings for magnetically supporting the driveshaft when rotating; and a controller for the bearingless motor, the controller is configured to adjust magnetic support provided by the bearingless motor to the driveshaft when rotating based on operation of the compressor.

Aspect 2. The compressor of Aspect 1, further comprising: one or more sensors for detecting one or more operating conditions of the compressor, wherein the controller is configured to increase an amount of the magnetic support provided by the bearingless motor based on one or more detected operating conditions of the compressor.

Aspect 3. The compressor of Aspect 2, wherein the one or more operating conditions include one or more of a suction pressure of the compressor, a discharge pressure of the compressor, and a position of the driveshaft.

Aspect 4. The compressor of any one of Aspects 1-3, wherein the bearingless motor is configured to selectively provide the magnetic support to the driveshaft based on the operation of the compressor.

Aspect 5. The compressor of any one of Aspects 1-4, further comprising: one or more driveshaft position sensors for detecting a position of the driveshaft, wherein the controller adjusts the magnetic support of the bearingless motor based on the position of the driveshaft detected by the one or more driveshaft position sensors.

Aspect 6. The compressor of any one of Aspects 1-5, wherein the adjusting of the magnetic support provided by the bearingless motor occurs during a normal operation of the compressor.

Aspect 7. The compressor of any one of Aspects 1-6, wherein the one or more magnetic bearings are configured to provide radial support to the driveshaft when rotating, and the magnetic support provided by the bearingless motor includes a radial magnetic support of the driveshaft when rotating.

Aspect 8. The compressor of Aspect 7, wherein the controller being configured to adjust the magnetic support provided by the bearingless motor to the driveshaft includes the controller being configured to increase radial magnetic support provided by the bearingless motor to the driveshaft in response to an increase in a radial load on the driveshaft.

Aspect 9. The compressor of any one of Aspects 1-8, wherein the controller is configured to receive a cooling requirement, determine a speed of the bearingless motor based on the cooling requirement, and control the bearingless motor to generate a rotational magnetic force corresponding to the determined speed and generate a suspension magnetic force that provides the magnetic support to the driveshaft.

Aspect 10. A method of operating a compressor, the compressor including a driveshaft, one or more magnetic bearings, and a bearingless motor, the method comprising: rotating, with the bearingless motor, the driveshaft to compress a working fluid; magnetically supporting, with the one or more magnetic bearings, the driveshaft being rotated; and magnetically supporting, with the bearingless motor, the driveshaft, which includes adjusting a magnetic support provided by the bearingless motor to the driveshaft being rotated based on operation of the compressor.

Aspect 11. The method of Aspect 10, wherein the adjusting of the magnetic support provided by the bearingless motor to the driveshaft based on operation of the compressor includes: detecting, with one or more sensors, one or more operating conditions of the compressor, and the adjusting of the magnetic support provided by the bearingless motor to the driveshaft includes adjusting the magnetic support provided by the bearingless motor based on the one or more operating conditions as detected by the one or more sensors.

Aspect 12. The method of Aspect 11, wherein the one or more operating conditions include one or more of a suction pressure of the compressor, a discharge pressure of the compressor, and a position of the driveshaft.

Aspect 13. The method of any one of Aspects 10-12, wherein the magnetic support is selectively provided by the bearingless motor to the driveshaft being rotated.

Aspect 14. The method of any one of Aspects 10-13, wherein the adjusting of the magnetic support provided by the bearingless motor occurs during a normal operation of the compressor.

Aspect 15. The method of any one of Aspects 10-14, wherein the magnetically supporting of the driveshaft with the one or more magnetic bearings includes radially magnetically supporting the driveshaft being rotated, and the magnetically supporting of the driveshaft with the bearingless motor includes radially magnetically supporting the driveshaft being rotated.

Aspect 16. The method of Aspect 15, wherein the adjusting of the magnetic support provided by the bearingless motor to the driveshaft includes increasing the radial magnetic support provided by the bearingless motor in response to an increased radial load on the driveshaft.

Aspect 17. The method of any one of Aspects 10-16, wherein the rotating of the driveshaft with the bearingless motor includes determining a speed of the bearingless motor based on a cooling requirement and generating a rotational magnetic force corresponding to the determined speed, and the magnetically supporting of the driveshaft with the bearingless motor includes the bearingless motor generating a suspension magnetic force to provide the magnetic support to the driveshaft.

Aspect 18. The method of any one of Aspects 10-17, wherein the magnetically supporting of the driveshaft with the bearingless motor includes operating the bearingless motor in a first mode and operating the bearingless motor in a second mode, a lesser amount of magnetic support is provided by the bearingless motor in the first mode.

Aspect 19. The method of Aspect 18, wherein the adjusting of the magnetic support provided by the bearingless motor to the driveshaft includes adjusting the bearingless motor between operating in the first mode and operating in the second mode based on the operation of the compressor.

Aspect 20. The method of Aspect 18, wherein the bearingless motor operating in the first mode provides no substantial amount of magnetic support to the driveshaft.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. In an embodiment, "affixed" as described herein can refer to being "directly affixed".

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A compressor, comprising:

a driveshaft;

a bearingless motor configured to rotate the driveshaft to compress a working fluid;

one or more magnetic bearings for magnetically supporting the driveshaft when rotating; and a controller for the bearingless motor, the controller is configured to adjust magnetic support provided by the bearingless motor to the driveshaft when rotating based on operation of the compressor, which includes the bearingless motor selectively providing the magnetic support to the driveshaft based on the operation of the compressor, wherein the controller is configured to operate the bearingless motor in a first mode in which the bearingless motor provides no substantial amount of magnetic support to the driveshaft.

2. The compressor of claim 1, further comprising:

one or more sensors for detecting one or more operating conditions of the compressor, wherein the controller is configured to increase an amount of the magnetic support provided by the bearingless motor based on the one or more operating conditions of the compressor as detected by the one or more sensors.

3. The compressor of claim 1, further comprising:

one or more driveshaft position sensors for detecting a position of the driveshaft, wherein the controller adjusts the magnetic support of the bearingless motor based on the position of the driveshaft detected by the one or more driveshaft position sensors.

4. The compressor of claim 1, wherein the controller is configured to adjust the magnetic support provided by the bearingless motor during a normal operation of the compressor.

5. The compressor of claim 1, wherein the one or more magnetic bearings are configured to provide radial support to the driveshaft when rotating, and the magnetic support provided by the bearingless motor includes a radial magnetic support of the driveshaft when rotating.

6. The compressor of claim 5, wherein the controller being configured to adjust the magnetic support provided by the bearingless motor to the driveshaft includes the controller being configured to increase radial magnetic support provided by the bearingless motor to the driveshaft in response to an increase in a radial load on the driveshaft.

7. The compressor of claim 1, wherein the controller is configured to receive a cooling requirement, determine a speed of the bearingless motor based on the cooling requirement, and control the bearingless motor to generate a rotational magnetic force corresponding to the determined speed and generate a suspension magnetic force that provides the magnetic support to the driveshaft.

8. A compressor, comprising:

a driveshaft;

a bearingless motor configured to rotate the driveshaft to compress a working fluid;

one or more magnetic bearings for magnetically supporting the driveshaft when rotating;

a controller for the bearingless motor, the controller is configured to adjust magnetic support provided by the bearingless motor to the driveshaft when rotating based on operation of the compressor, which includes the bearingless motor selectively providing the magnetic support to the driveshaft based on the operation of the compressor; and one or more sensors for detecting one or more operating conditions of the compressor, wherein the controller is configured to increase an amount of the magnetic support provided by the bearingless motor based on the one or more operating conditions of the compressor detected by the one or more sensors, the one or more operating conditions including one or more of a suction pressure of the compressor and a discharge pressure of the compressor.

9. A method of operating a compressor, the compressor including a driveshaft, one or more magnetic bearings, and a bearingless motor, the method comprising:

rotating, with the bearingless motor, the driveshaft to compress a working fluid;

magnetically supporting, with the one or more magnetic bearings, the driveshaft being rotated; and magnetically supporting, with the bearingless motor, the driveshaft, which includes adjusting a magnetic support provided by the bearingless motor to the driveshaft being rotated based on operation of the compressor and the bearingless motor selectively providing the magnetic support to the driveshaft based on the operation of the compressor, wherein the magnetically supporting of the driveshaft with the bearingless motor includes operating the bearingless motor in a first mode in which the bearingless motor provides no substantial amount of magnetic support to the driveshaft.

10. The method of claim 9, wherein the adjusting of the magnetic support provided by the bearingless motor to the driveshaft based on operation of the compressor includes:

detecting, with one or more sensors, one or more operating conditions of the compressor, and the adjusting of the magnetic support provided by the bearingless motor to the driveshaft includes adjusting the magnetic support provided by the bearingless motor based on the one or more operating conditions as detected by the one or more sensors.

11. The method of claim 10, wherein the one or more operating conditions include one or more of a suction pressure of the compressor, a discharge pressure of the compressor, and a position of the driveshaft.

12. The method of claim 9, wherein the magnetic support is selectively provided by the bearingless motor to the driveshaft being rotated.

13. The method of claim 9, wherein the adjusting of the magnetic support provided by the bearingless motor occurs during a normal operation of the compressor.

14. The method of claim 9, wherein the magnetically supporting of the driveshaft with the one or more magnetic bearings includes radially magnetically supporting the driveshaft being rotated, and the magnetically supporting of the driveshaft with the bearingless motor includes radially magnetically supporting the driveshaft being rotated.

15. The method of claim 14, wherein the adjusting of the magnetic support provided by the bearingless motor to the driveshaft includes increasing the radial magnetic support provided by the bearingless motor in response to an increased radial load on the driveshaft.

16. The method of claim 9, wherein the rotating of the driveshaft with the bearingless motor includes determining a speed of the bearingless motor based on a cooling requirement and generating a rotational magnetic force corresponding to the determined speed, and the magnetically supporting of the driveshaft with the bearingless motor includes the bearingless motor generating a suspension magnetic force to provide the magnetic support to the driveshaft.

17. The method of claim 9, wherein the magnetically supporting of the driveshaft with the bearingless motor includes operating the bearingless motor in the first mode and operating the bearingless motor in a second mode, a lesser amount of the magnetic support is provided by the bearingless motor in the first mode.

18. The method of claim 17, wherein the adjusting of the magnetic support provided by the bearingless motor to the driveshaft includes adjusting the bearingless motor between operating in the first mode and operating in the second mode based on the operation of the compressor.

* * * * *